US008255792B2

(12) United States Patent
Mor

(10) Patent No.: US 8,255,792 B2
(45) Date of Patent: *Aug. 28, 2012

(54) TECHNIQUES FOR BINDING SCALABLE VECTOR GRAPHICS TO ASSOCIATED INFORMATION

(75) Inventor: Yishay Mor, Zichron Ya'akov (IL)

(73) Assignee: Cisco Technology, Inc., San Jose, CA (US)

( * ) Notice: Subject to any disclaimer, the term of this patent is extended or adjusted under 35 U.S.C. 154(b) by 1110 days.

This patent is subject to a terminal disclaimer.

(21) Appl. No.: 11/788,500

(22) Filed: Apr. 20, 2007

(65) Prior Publication Data

US 2007/0198918 A1 Aug. 23, 2007

Related U.S. Application Data

(63) Continuation of application No. 09/703,505, filed on Oct. 31, 2000, now Pat. No. 7,210,095.

(51) Int. Cl.
*G06F 17/00* (2006.01)
(52) U.S. Cl. ...................................................... 715/234
(58) Field of Classification Search .................... 715/235
See application file for complete search history.

(56) References Cited

U.S. PATENT DOCUMENTS

| 5,968,125 | A * | 10/1999 | Garrick et al. ............... 709/224 |
| 6,565,609 | B1 | 5/2003 | Sorge et al. |
| 6,611,725 | B1 | 8/2003 | Harrison et al. |
| 6,631,497 | B1 * | 10/2003 | Jamshidi et al. ............ 715/205 |
| 6,674,445 | B1 | 1/2004 | Chithambaram et al. |
| 6,675,230 | B1 | 1/2004 | Lewallen |
| 6,675,355 | B1 * | 1/2004 | Demopoulos et al. ........ 715/233 |
| 6,741,242 | B1 * | 5/2004 | Itoh et al. ..................... 345/419 |
| 6,857,070 | B1 * | 2/2005 | Fukuda ......................... 713/153 |
| 2002/0055928 | A1 * | 5/2002 | Worthington ................. 707/102 |

OTHER PUBLICATIONS

Title: Scalable Vector Graphics (SVG) 1.0 Specification, Publisher: W3C, pp. 1-492, Date: Aug. 2, 2000, URL: <http://www.w3.org/TR/2000/CR-SVG-20000802/>.*
Title: XML, a new start for the web, Author: Michel Goosens, Date: May 2000, pp. 1-32, URL: <http://matriisi.ee.tut.fi/hmopetus/prj/xmlsem2000/arc/xml2000-3.pdf>.*
May et al. "Integrating and Querying Distributed XML data via Xlink", 2008, pp. 508-566, URL:<http://www.sciencedirect.com/science/article/pii/S0306437908000136>.*
Martin, Didier, "Integration by Parts: XSLT, XLink and SVG", available at http://www.xml.com/pub/a/2000/03/22/style/index.html , Mar. 22, 2000, 6 pages. Dietl, Josef, "The World Wide Web Consortium Releases First Working Draft of Scalable Vector Graphics (SVG) Specifications", available at http://www.w3.org/press/1999/testimonials-SVG-WD , published by W3C, 1999, 4 pages.
Udell, J., Scalable Vector Graphics, BYTE.com, Jun. 19, 2000.
Thomas, K, "Learning How to Code SVG: Scalable Vector Graphics", WebDeveloper.com, 2001.
Sall, K., "Doing it With SVG (Scalable Vector Graphics)", Web Developer's Virtual Library, Sep. 6, 1999.
"Scalable Vector Graphics (SVG) 1.0 Specification", W3C Candidate Recommendation, Nov. 2, 2000, http://www.w3.org/TR/2000/CR-SVG-20001102, pp. 1-513.

* cited by examiner

*Primary Examiner* — Doug Hutton, Jr.
*Assistant Examiner* — Mustafa Amin
(74) *Attorney, Agent, or Firm* — Hickman Palermo Truong Becker Bingham Wong LLP

(57) ABSTRACT

Techniques for providing information about an object through a graphical interface include providing in a document scalable vector graphics (SVG) statements associated with a graphical representation of the object. The SVG statements are bound to a pointer to a resource that includes information pertaining to the object. The pointer to the resource associated with the SVG statements may then be extracted from the document. Information is then retrieved from the resource based on the pointer. The SVG statements may then be modified based on the information. Then a second graphical representation of the object is presented based on the SVG statements after the modifying. The presentation provides information, or control, or both, for the object.

22 Claims, 15 Drawing Sheets

```
<?xml encoding="US-ASCII" version="1.0"?>        /―302

<!ELEMENT bind (#EMPTY)>        /―304
<!ATTLIST bind
    name ID   #REQUIRED
    uri IDREF #IMPLIED
    nmsp IDREF #IMPLIED>

<!ELEMENT bind.uri(bind.postData?)>        /―306
<!ATTLIST bind.uri
    name ID   #REQUIRED
    hrefCDATA #IMPLIED>

<!ELEMENT postData (#ANY)>        /―308

<!ELEMENT bind.namespace (bind.namespace*)>        /―310
<!ATTLIST bind.namespace
    name ID   #REQUIRED
    nmsid CDATA #IMPLIED>

<!ELEMENT bind.element(#EMPTY)>        /―312
<!ATTLIST bind.element
    name      ID   #IMPLIED
    bind.name    IDREF # REQUIRED
    bind.target CDATA# REQUIRED>
```

```
<?xml version="1.0" standalone="no"?>                                              ←402
<!DOCTYPE svg SYSTEM "svg-20000303stylable.dtd" >                    ←404
<svg xmlns:svg="http://DOMAIN1/svg-20000303stylable.dtd"
     xmlns:bind="http://DOMAIN2/dtds/cim -svg-binding.dtd"                } 406
     width="500" height="500">

<bind:bind name="device-data" uri="device-src" nmsp="device-inventory" />
<bindbind.uriname="device-src" href="http://DOMAIN3/wbem /">       ←412
<bindbind.postData>      ←414
</bindbind.postData>     ←416
<bindbind.uri>           ←417                                                    } 408
<bindbind.namespace name="device-inventory"
  nmsid="CIM /MESSAGE$IMPLERSP/IMETHODRESPONSE@{NAME=EnumerateElements}"/>  } 418
 • ←420
 •
<svg:image x="100" y="150" width="32" height="32" xlink:href="32x32-ATMSwitch_green.gif"   } 422
           transform="matrix(1 0 0 1 98 -120)">
  <bind:bind elementbind.name="device-data"
             bind.target="INSTANCE@{CLASSNAME=ManagedNetworkElement}             }
             /PROPERTY@{NAME=ID}{VALUE=629}"/>
</image>    ←424
 •
 •
</svg>
```

TECHNIQUES FOR BINDING SCALABLE VECTOR GRAPHICS TO ASSOCIATED INFORMATION

CROSS-REFERENCE TO RELATED APPLICATIONS; PRIORITY CLAIM

This application claims domestic priority under 35 U.S.C. §120 as a Continuation of prior U.S. patent application Ser. No. 09/703,505, filed by Yishay Mor on Oct. 31, 2000 now U.S. Pat. No. 7,210,095 and entitled "TECHNIQUES FOR BINDING SCALABLE VECTOR GRAPHICS TO ASSOCIATED INFORMATION", the entire contents of which is hereby incorporated by reference for all purposes as if fully set forth herein.

FIELD OF THE INVENTION

The present invention relates to using scalable vector graphics to represent complex data stored in a separate resource; and, more specifically, to binding an element of the scalable vector graphics to a location in the separate resource associated with the element.

BACKGROUND OF THE INVENTION

The World Wide Web involves a network of servers on the Internet, each of which is associated with one or more Hypertext Markup Language (HTML) pages. The HTML pages associated with a server provide information and hypertext links to other documents on that or other servers. Servers communicate with clients by using the Hypertext Transfer Protocol (HTTP). Users of the World Wide Web use a client program, referred to as a browser, to request, decode and display information from servers. When the user of a browser selects a link on an HTML page, the browser that is displaying the page sends a request over the Internet to the server associated with the Universal Resource Locator (URL) specified in the link. In response to the request, the listener transmits the requested information to the browser that issued the request. The browser receives the information, presents the received information to the user, and awaits the next user request.

The HTML standard is one application of a more general markup language standard called the Standard Generalized Markup Language (SGML). Recently, a subset of SGML that is more powerful and flexible than HTML has been defined and has gained popularity for providing information on the Internet. The new standard, developed and promoted by the World Wide Web Consortium (W3C), is called the Extensible Markup Language (XML). XML provides a common syntax for expressing structure in data. Structured data refers to data that is tagged for its content, meaning, or use. XML provides an expansion of the tagging that is done in HTML, which focuses on format or presentation. Given the elements defined and used by XML, a document object model (DOM) is used to define how to access the information in the XML documents. Using the DOM, programmers can script dynamic content to cause a specific piece of content to behave in certain way. For example, a piece of text may change color when a user positions a cursor over the text.

Scalable vector graphics (SVG) is a language for describing two-dimensional graphics in XML. The language is presently under development by W3C. SVG has many advantages over image formats most commonly used currently on the World Wide Web. SVG files are expressed with plain text that describes the various strokes and processing techniques used to construct a graphical representation. Such a description of graphic content is called a vector format and is distinguished from raster or bitmapped formats which describe individual picture elements (pixels) by the intensity of one or more colors for a two dimensional array of pixels. Because SVG files are text, they can be made or modified by a large number of text manipulation tools. SVG files are smaller and more compressible than raster file formats. Because SVG is a vector format the graphics can be scaled to any size display without producing the stair-stepped lines or edges common in bitmapped images. For related reasons, SVG allows unrestricted zooming and panning. In addition, the text in SVG graphics is selectable and searchable, while finding text in a bitmapped images requires an optical character recognition process that does not work in all circumstances. Also, SVG is an open standard and not proprietary. In addition, SVG offers all the advantages of XML. It is anticipated that SVG will be widely used to generate graphical representations that can be transferred from server to client over the Internet.

While SVG can be used for a variety of applications, there are currently only a few applications. Particularly lacking are applications to chart complex data using SVG as a rendering tool and to interact with the data across the World Wide Web using the SVG rendering as a thin graphical interface. For example, an application is not available for charting network topology using SVG and managing the network through the SVG rendering in a client process. Neither is an application available using SVG files for utilizing information in a geographical information system (GIS).

Performing the same functions over the World Wide Web without SVG files suffer other disadvantages. Raster files are large and consume considerable bandwidth to transmit over the Web. In addition, raster files are not easily searched for text. Such searching is useful, for example, when a user wants to find a particular device in the network. Downloading an application to run from the browser can provide the functionality desired, but the application will consume considerable computational resources on the client machine.

Based on the foregoing, there is a clear need in this field for techniques to utilize the advantages of SVG files for passing graphical information over a network to a client in order to allow the client to interact with extensive, complex information residing in a resource on a server on the network.

SUMMARY OF THE INVENTION

The foregoing needs, and other needs that will become apparent from the following description, are fulfilled by the present invention, which comprises, in one aspect, methods that allow the advantages of SVG files to be utilized in a graphical user interface for interacting with complex data, such as in a graphical user interface for managing a network of arbitrary and evolving topology, or for utilizing information in a GIS. As a result, small bandwidth, small computational load, and scalable display with searchable elements on the client machine may be achieved. These techniques also allow a standard, thin SVG compliant client to interact with variable and complex data.

In one aspect, techniques for providing information about an object through a graphical interface include providing in a document SVG statements associated with a graphical representation of the object. The SVG statements are bound to a pointer to a resource that includes information pertaining to the object.

According to an embodiment of this aspect, the resource is a database and the pointer includes a query for a data item in the database. According to another embodiment, the resource is a second document and the pointer includes a location of an element in the second document.

In another aspect, techniques for using information about an object through a graphical interface include presenting a graphical representation of the object based on SVG statements in a document. A pointer to a resource is extracted from a binding element in the document. The binding element is associated with the SVG statements. Then it is determined whether a user has selected the graphical representation of the object. If the user has selected the graphical representation, then information in the resource based on the pointer is utilized.

In another aspect, techniques for presenting information about an object through a graphical interface include retrieving a document including SVG statements associated with a first graphical representation of the object. A pointer to a resource is extracted from a binding element in the document. The binding element is associated with the SVG statements. Information is then retrieved from the resource based on the pointer. The SVG statements are modified based on the information. Then a second graphical representation of the object is presented based on the SVG statements after the modifying.

In one embodiment of this aspect, modifying the SVG statements includes inserting an anchor for a hyperlink to another resource. The second graphical representation of the object is inserted into the anchor. In another embodiment, the hyperlink includes at least a portion of the information retrieved from the resource based on the pointer.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a listing of XML statements for a document type definition file.

FIG. 4 is a listing of XML statements for an SVG document bound to information in a separate resource.

DETAILED DESCRIPTION OF THE PREFERRED EMBODIMENT

Techniques for binding structured vector graphics (SVG) graphical objects to data in a separate resource are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Figure 1:
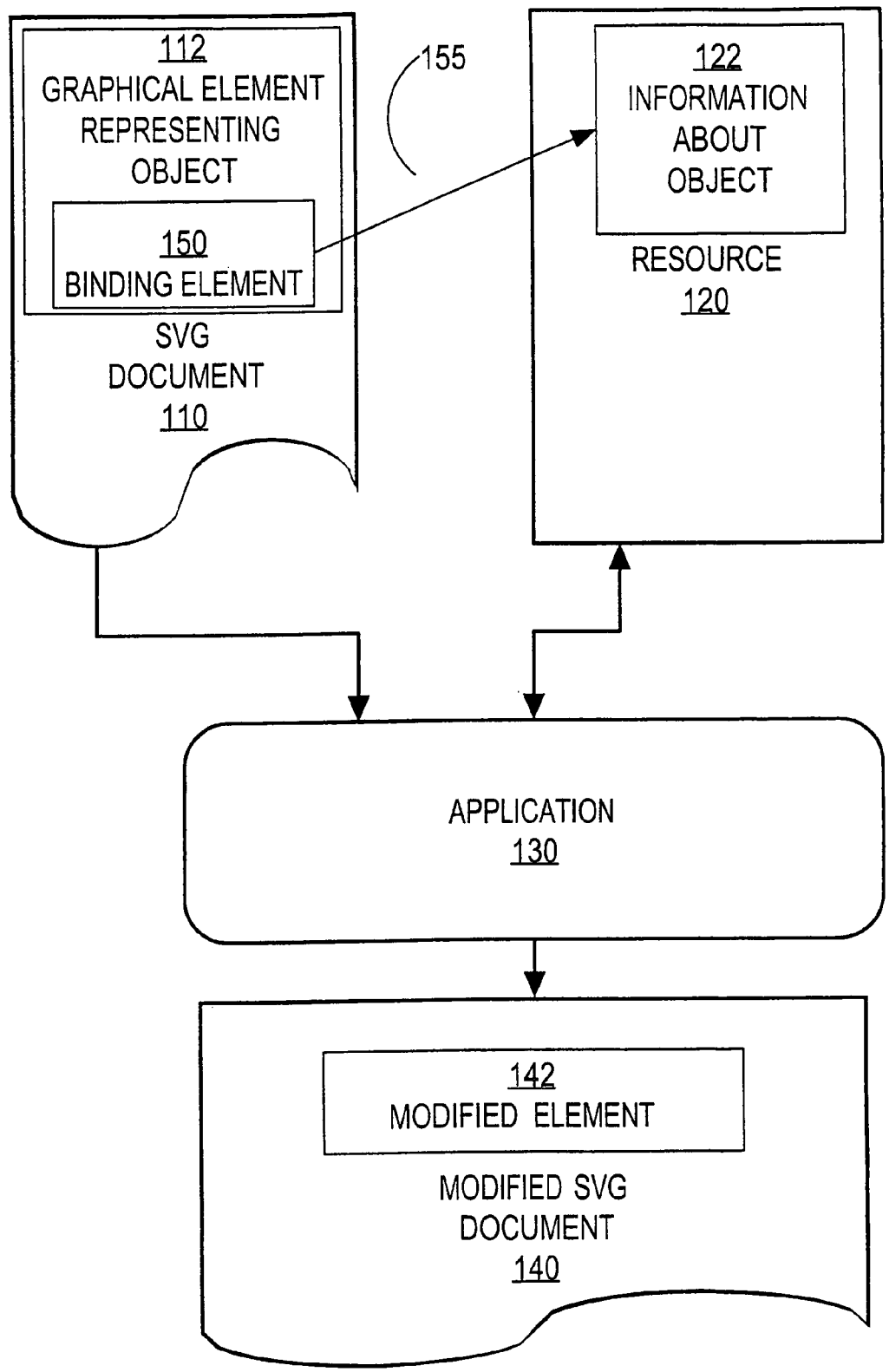
FIG. 1 is a block diagram showing input and output for an application.

FIG. 1 is a block diagram showing input and output for an application. Resource 120 contains information 122 about an object. The resource 120 can be a database, or an application, or a web page or other document. The object can be any object in the real world about which information is of interest to a user. For example, the object may be a network device such as a switch, router, gateway, a link between two other network devices, etc. In this example, the resource 120 is a database describing network topology and the configuration of devices. The information 122 about the object includes database elements, such as tables and records, pertaining to the network device or link. As another example, the object is a business, such as a bicycle retail store. In this example, information pertaining to the business, such as address and telephone number and hours of operation constitutes the information 122 about the object. A resource containing this information 122 is, for example, a web page generated by the local Chamber of Commerce.

A graphical element 112 representing the object appears in SVG document 110. For example, the SVG document 110 can depict the topology of the entire network in which a particular device is represented by an icon. In this case, the icon is the graphical element 112 representing the device. In the other example, the SVG document 110 depicts a street map of the local downtown area with certain individual buildings represented by polygons. In this example, one polygon is the graphical element 112 representing the bicycle retail store.

A binding element 150 is included with the graphical element 112. The binding element 150 identifies the resource 120 and the location of the information 122 about the object represented by the graphical element 112. The binding element 150 points to the information 122 about the object, as represented in FIG. 1 by the arrow 155. This arrangement offers the advantage of allowing a user to access information 122 about the object and employ the functionality of resource 120 without substantially increasing the size or complexity of SVG document 110. For example, functionality of a database engine associated with resource 120 can be employed to obtain and manipulate information 122 about the object without having to incorporate all the information, or having to compose and incorporate scripts to provide the functionality, into the SVG document 110.

An application 130 reads the SVG document 110 and interacts with resource 120 to produce a modified SVG document 140. The modified SVG document 140 includes a modified element 142 that reflect some aspect of the information 122 about the object. For example, the modified element 142 is a graphical element that has a color that reflects the current status of a network device—e.g., green if the device is functioning normally and red if the device is inoperative or offline. In this example, the application 130 determines whether the device is operative or inoperative by retrieving information 122 about the device from a database resource 120. Another application queries the devices in the network, collects information about the devices and links, and updates the database resource 120.

In another example, the application 130 is a geographical information system. In this case, a user may select an area encompassing one more polygons in the street map produced by SVG document 110. If the user requests from application 130 the telephone numbers of the buildings in the selected area, application 130 requests resource 120 to provide telephone numbers associated with each polygon graphical element 112 by the binding element 150. The application 130 then produces SVG document 140 including each selected polygon with a telephone number overwritten as a modified graphical element 142.

In another embodiment, the application 130 associates another application, not shown, with the graphical element 112. This is done by including a link to the other application in the modified element 142. The link includes parameters used by the other application. The parameters included in the link are obtained from information 122 in resource 120 by application 130 based on the binding element 150 associated with graphical element 112 in the original SVG document 110. For example, the link is to an editor that allows a user to change the configuration of the device in the network. The editor requires an Internet Protocol (IP) address of the device whose configuration is to be changed. The application 130 provides the editor with the device address as a parameter in the link to the editor. The device address is included among the information 122 in resource 120. When the user selects graphical element 112 in the graphical representation formed by SVG document 110 and indicates to application 130 that the selected device is to be edited, application 130 uses the binding element 150 to find information 122 that includes the device address. Thus the application 130 is able to insert a link to the editor in the modified graphical element 142 that includes the device address as a parameter.

Further description of the binding element 150 in SVG document 110 and application 130 is given herein. In a particular embodiment described below, the resource 120 is a database of network devices and links, the application 130 is a quality of service policy manager, and the SVG document 110 is a graphical representation of network topology.

Defining Binding Elements for SVG Documents

Binding elements are defined for an SVG documents using Extensible Markup Language (XML) grammar, represented by a document type definition (DTD) or XML schema. A DTD is a set of syntax rules for elements in SMGL and XML documents. An HTML tag is a particular kind of SMGL element. The DTD tells what elements can be used in a document, what order they should appear in, which elements can appear inside other elements, which elements have attributes, and what those attributes are. A DTD can be part of an XML document, but it is usually a separate document or series of documents. XML allows documents to contain elements from several distinct DTD files by the use of namespaces. In particular, elements from other, independently created DTD files can be interleaved in an SVG document. FIG. 3 shows the contents of one example DTD file 300 for defining binding elements that are used in SVG documents.

The first line 302 identifies the document as following the XML standards. The remaining lines define elements that can be used in XML documents relying on this DTD, and specify the attributes and relationships among the five elements.

The first element is "bind" element 304 which uses the attributes "name," "uri," and "nmsp." The second element is "bind.uri" element 306 which uses the attributes "name" and "href." The third element is "postData" element 308 which has no attributes. The fourth element is "bind.namespace" element 310 which uses attributes "name" and "nmsid." The fifth element is bind.element 312 which has the attributes "name," "bind.name" and "bind.target."

In this embodiment, the bind element 304 is used as a short handle for the common portion of the information that completely specifies a resource and target. In addition, the bind element 304 can be used to differentiate one binding element from another. The bind.uri element 306 is here used to identify the resource 120 that contains the information related to at least one of the graphical elements in an SVG document. In some embodiments the resource is identified by its Universal Resource Locator (URL) address. In other embodiments the resource is identified by other identifiers, such as by a Universal Resource Identifier (URI). In still other embodiments, the bind.uri element is used to hold a standard header including several URIs only some of which may be needed by a particular SVG document. The postData element 308 is used to provide the resource 120 any information needed to employ the resource, such as a user logon ID, or to identify a portion of the resource where the associated information is found, such as a database table, or view name, or standard query. The bind.namespace element 310 is used to identify a portion of the output that results from providing the postData to the resource, such as a group of XML elements belonging to a namespace of an XML document produced as a result of a database query. The bind.element element 312 is used to identify where, in the portion indicated by the namespace, the information associated with the graphical element can be found.

According to the standards of the DTD structure defined by W3C, the statements shown in FIG. 3 mean that the bind.uri element 306 may include none or, at most, one postData element 308, and that namespace can include zero or more other namespace elements within it. The #EMPTY parameter for the "bind" element 304 and the "bind.element" element 312 means these elements do not contain any other elements or data themselves; instead, any data is associated with the attributes of these two elements. The name attributes of the bind, bind.uri, bind.namespace and bind.element elements, are all of data type "ID" indicating that a unique identifier must be used when a value is assigned to any of these attributes. The "#REQUIRED" property of an attribute means that the attribute must be assigned a value each time the element is used. Each element requires a name attribute, except for the bind.element element. The "#IMPLIED" property of the name attribute of the bind.element element means that the user may optionally assign a value to this attribute when using this element. If an attribute has type "IDREF," then the attribute must be assigned a reference to an ID of another element if the attribute is used. If an attribute has type "CDATA," then the attribute may be assigned any character data if the attribute is used.

These particular elements and attributes allow application 130 the flexibility to deal with a large range of resources 120 when using the binding elements 150 in the SVG document 110. The resource 120 is primarily identified by using the bind.uri element 306. If the resource requires input, the input can be specified using the postData element 308. If the information desired resides in a portion of the resulting output, that portion can be specified using the bind.namespace element 310. For example, a WBEM application outputs an XML document with data content and arrangement that is not entirely controlled by the requestor. A portion of that XML document is identified using the bind.namespace element. 310. The bind element 304 is used to define a particular scope or context of a particular bind.uri using a particular bind.namespace. Then, a particular location in the output can be specified using the bind.element element 312. The use of these elements in an embodiment utilizing a WEBM application is described in more detail next.

The DTD shown in FIG. 3 is stored as a separate document addressed by its URL. For purposes of this example, the DTD of FIG. 3 is assumed to have a file name of "cim-svg-binding.dtd" and to be stored in directory "dtds" of a server identified by its domain name "DOMAIN2." However, any storage location may be used. In alternative embodiments, the DTD statements are included within the SVG document.

Using Binding Elements in an SVG Document

FIG. 4 shows portions of the contents of one example SVG document 400 that uses the DTD of FIG. 3 to bind graphical elements with data in a separate resource.

The first line 402 in FIG. 4 identifies the document as an XML document. The second line 404 identifies the document as an SVG document using a particular SVG DTD. Lines 406 constitute an XML statement that identifies the XML name spaces used to resolve elements involving "svg" and "bind" in the current document. Information in lines 406 also specifies the width and height of the graphical area constructed by the current SVG document.

The lines 408 in FIG. 4 utilize instances of several of the binding elements defined in the DTD of FIG. 3. These lines 408 define one resource being used, including the input to the resource. These are described next line by line.

The lines 408 include a line 410 that has one statement:
<bind:bind name="device-data" uri="device-src" nmsp="device-inventory"/>
This statement indicates that a name "device-data" will refer to a resource named "device-src" and a portion of the output named "device-inventory." Specifically, the leading "bind:" indicates the element being used is defined in "xlmns:bind," which referenced the DTD of FIG. 3. The next "bind" value in line 410 indicates that the bind element is being used. The bind element has a required name attribute of type ID. In line 410, the name attribute is assigned a value of "device-data." This indicates that reference to this element can be made using the shortcut name "device-data." The name "device-data" is chosen to be descriptive of the information expected to be utilized in the resource 120, i.e., that the information will give data about a device. The resource associated with the bind element is identified in the uri attribute as "device-src" and the namespace associated with this bind element is identified in the nmsp attribute as "device-inventory." These are references to other elements. The full references needed for the device-src and its output device-inventory are given in the other elements used in the next statements.

Lines 408 include a second line 412:
<bind:bind.uri name="device-src" href="http://DOMAIN3/wbem/">
This statement indicates the resource named "device-src" can be accessed at "DOMAIN3/wbem/" using the Hypertext Transfer Protocol (HTTP). Specifically, the leading "bind:" reference indicates the DTD of FIG. 3. The term "bind.uri" indicates that the bind.uri element is being used. The bind.uri element has a required name attribute of type ID. Here the name attribute is assigned a value of "device-src." This indicates that reference to the resource 120 can be made using the shortcut name "device-src." The identifier "device-src" is chosen to be descriptive of the resource 120, i.e., that the resource is the source (src) of information about a device. The bind.uri element has an optional anchor reference or href attribute of type CDATA. Here href is assigned a value that points to the wbem resource on the server DOMAIN3. Thus, this line provides details for the "device-src" resource referenced by the preceding statement.

The third line 414, fourth line 416, and fifth line 417 of the lines 408 indicate that no input is required to access the resource defined in this bind.uri element. The leading "bind:" in each indicates the DTD of FIG. 3. Line 417 indicates the end of the statements controlled by the bind.uri element. Lines 414 and 416 start and stop or delimit the statements that are controlled by the postData element. In this example, no data is included between the start and stop postData elements. A postData element may be embedded in a bind.uri element according to the DTD in FIG. 3. The DTD allows the postData elements to be omitted altogether, where, as in the example, there is no information to input to the resource. The DTD also allows the separate postData element delimiters to be replaced by "<bind.postData/>" where no data is being provided.

The sixth and seventh of the lines 408 comprise a namespace binding statement 418 that indicates the output named "device-inventory" is accessible in an XML document at an "Enumerate Elements" element. Again, the leading "bind:" indicates the DTD of FIG. 3. The term "bind.namespace" indicates that the bind.namespace element is being used. The bind.namespace element has a required name attribute of type ID. Here the name attribute is assigned a value of "device-inventory." This indicates that reference to a portion of the output from a resource can be made using the shortcut name "device-inventory." The identifier "device-inventory" is chosen to be descriptive of the portion of the output that is being used. The bind.namespace element has an optional nmsid attribute of type CDATA. Here nmsid is assigned a value that indicates a portion of the expected output of the WBEM server. The output is IMETHODRESPONSE in a directory relative to the current SVG document named CIM/SIMPLERSP. The device inventory information is associated with an XML element having the name "EnumerateElements" in the IMETHODRESPONSE output. This statement gives details for the "device-inventory" referenced by the bind element, described above with respect to the first of the seven lines.

Later in the document, indicated in FIG. 4 by ellipses 420, an SVG graphical element is defined between an image element 422 and an end image element 424, beginning with "<svg:image," and "</image>," respectively. The leading "svg:" indicates the element being used is defined in "xlmns:svg" above, which references the SVG DTD. The attributes of this image element define an image that is 32 pixels wide by 32 pixels high and is stored in the gif file named "32×32-ATMSwitch_green." These attributes also indicate where to place the image and how to transform it using standard SVG conventions. This element and these attributes are defined by the SVG standards.

Included within this graphical element is an instance of the bind.element element 426 beginning with "<bind:bind.element" and ending with "/>". Statements marked by this "bind.element" element set values for the "bind.name" attribute and the "bind.target" attribute of the element. The bind.name attribute is set to "device-data" and thereby indicates the first line 410 of the seven lines 408, which associates the uri of "device-src" and the namespace of "device-inventory" with this bind.element. The bind.target attribute is set to a value that indicates a particular portion of the device-inventory output. That portion is specified by the network element that has an identifier of "629." In this example the target is specified with an XML statement like a database query into the device-inventory file. In effect, these statements indicate that the image is bound to a network element stored in the EnumerateElements section of the device-inventory file, where the property called "ID" has a value of "629."

By virtue of these statements, a binding element named "device-data" is defined using the element properties defined in the DTD of FIG. 3, and the gif image described in the image element is bound by a device-data bind.element element to a particular instance of a class of managed network devices in a database result called device-inventory. If an application allows a user to select this image, the application has the reference the application needs to operate on the information in the database related to the image.

FIG. 3 and FIG. 4 illustrate just one example of SVG bindings as disclosed herein. Of course, other elements with other attributes can be defined in a DTD and used in an SVG document to bind a graphical element with information in another resource.

Producing a Modified SVG Document

As described above with respect to FIG. 1, an application 130 can operate on the SVG document 110 to produce a modified SVG document 140.

Figure 5:
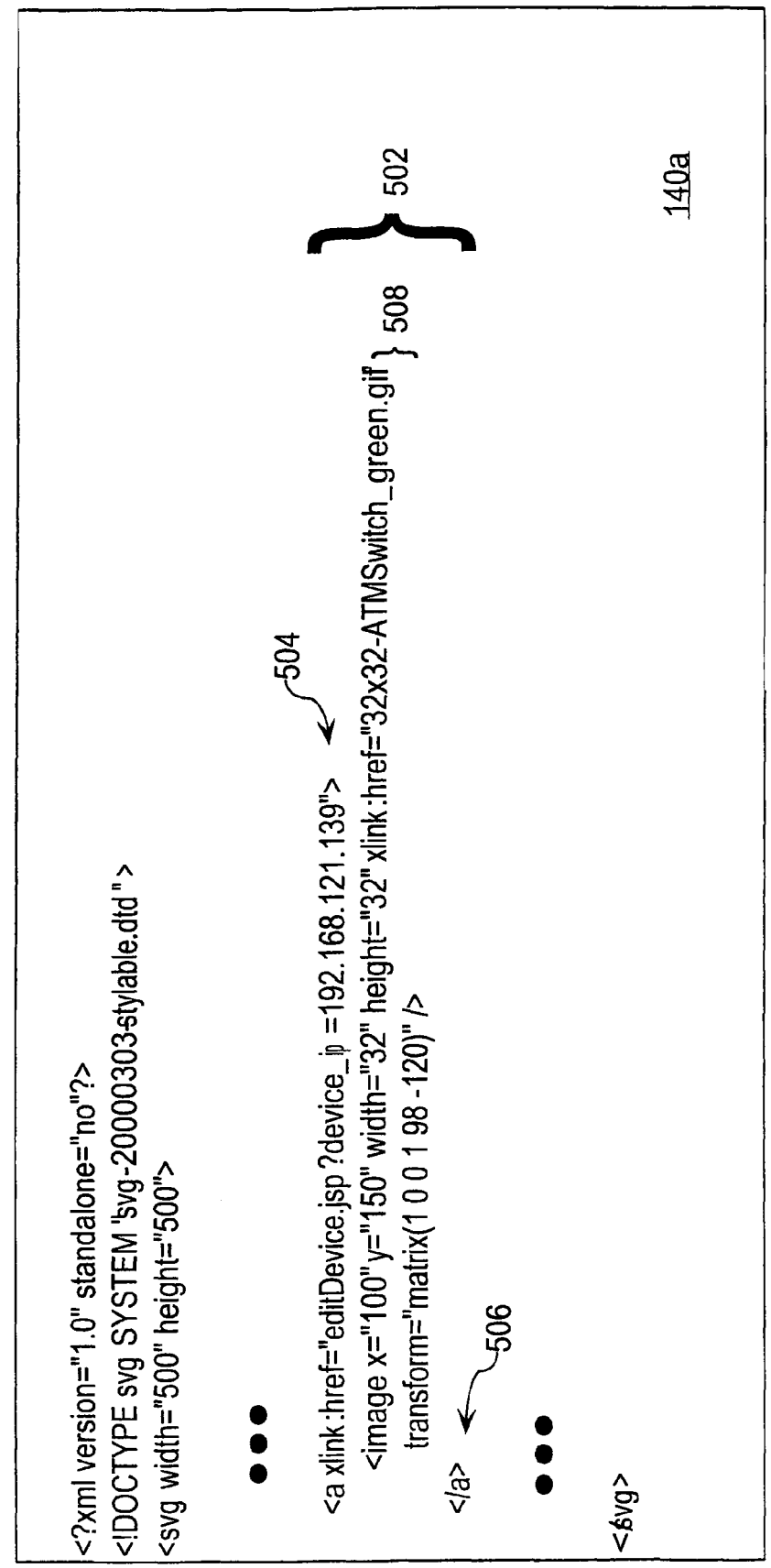
FIG. 5 is a listing of XML statements for a modified SVG document.

FIG. 5 shows part of the contents of a particular modified SVG document 140a. In this modified document 140a, no use is made of the binding elements. Consequently, at the beginning of the modified SVG document 140a, there is no need to reference a namespace for elements involving "bind". As can be seen in FIG. 5, the XLM namespace for bind is not referenced and no bind elements are included in the modified document 140a.

In the modified SVG document 140a, a link to another application is anchored to the document. This is shown by anchor statement 502 in FIG. 5. A begin anchor element 504 ("<a>") includes an attribute "xlink:href" that defines the link to the other application. The other application is found in the resource in file editDevice.jsp. The parameters required by the other application are included in the link after the character "?". In this embodiment, the parameter specifies the IP address of the device using the keyword "device-ip" set equal to the particular IP address of the device to be edited. In this example, that particular address is "192.168.121.139." The link to the other application is displayed on the user's browser as the image described in the image element 508 that is included before the end anchor element 506 ("</a>").

The IP address "192.16 8.121.139," which is included as a parameter for the edit device application, editDevice, was not available in the original SVG document shown in FIG. 4. The application 130 that generated the modified SVG document shown in FIG. 5 obtained this particular IP address from the device database resource 120 using the binding elements in the original SVG document shown in FIG. 4.

Further, the modified SVG document 140 no longer needs the binding elements, so that all references to these elements and their DTD can be eliminated from the modified SVG document 140a.

Thus, using techniques described herein, small, modified SVG documents are generated that can serve as graphical interfaces for users to select any functionality using complex data associated with any object represented by a graphical element in the SVG documents. This is achieved with thin SVG documents that are free of vast amounts of complex data that burden the bandwidth between client and server, and free of scripting that is computationally heavy for the client. In some embodiments, the thin SVG files are also free of binding elements and references to the DTD defining the binding elements.

Using Information Through an SVG Interface

Figure 6A:
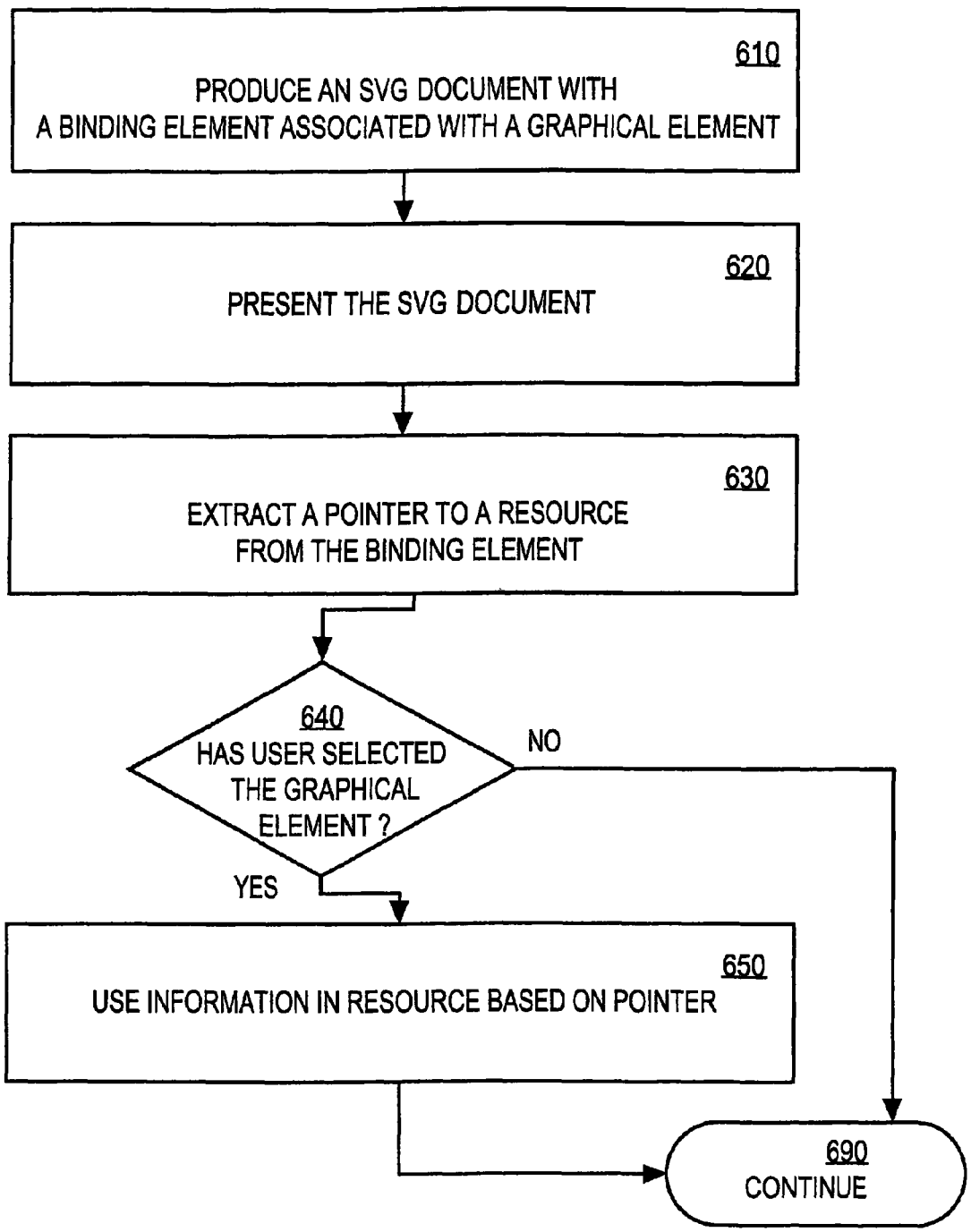
FIG. 6A is a flow chart for using SVG documents bound to information in separate resources.

FIG. 6A is a flow chart showing a process of using SVG documents bound to information in separate resources. In the example of FIG. 6A, the original SVG document 110 is used as a graphical interface for obtaining and using information about an object.

Figure 6B:
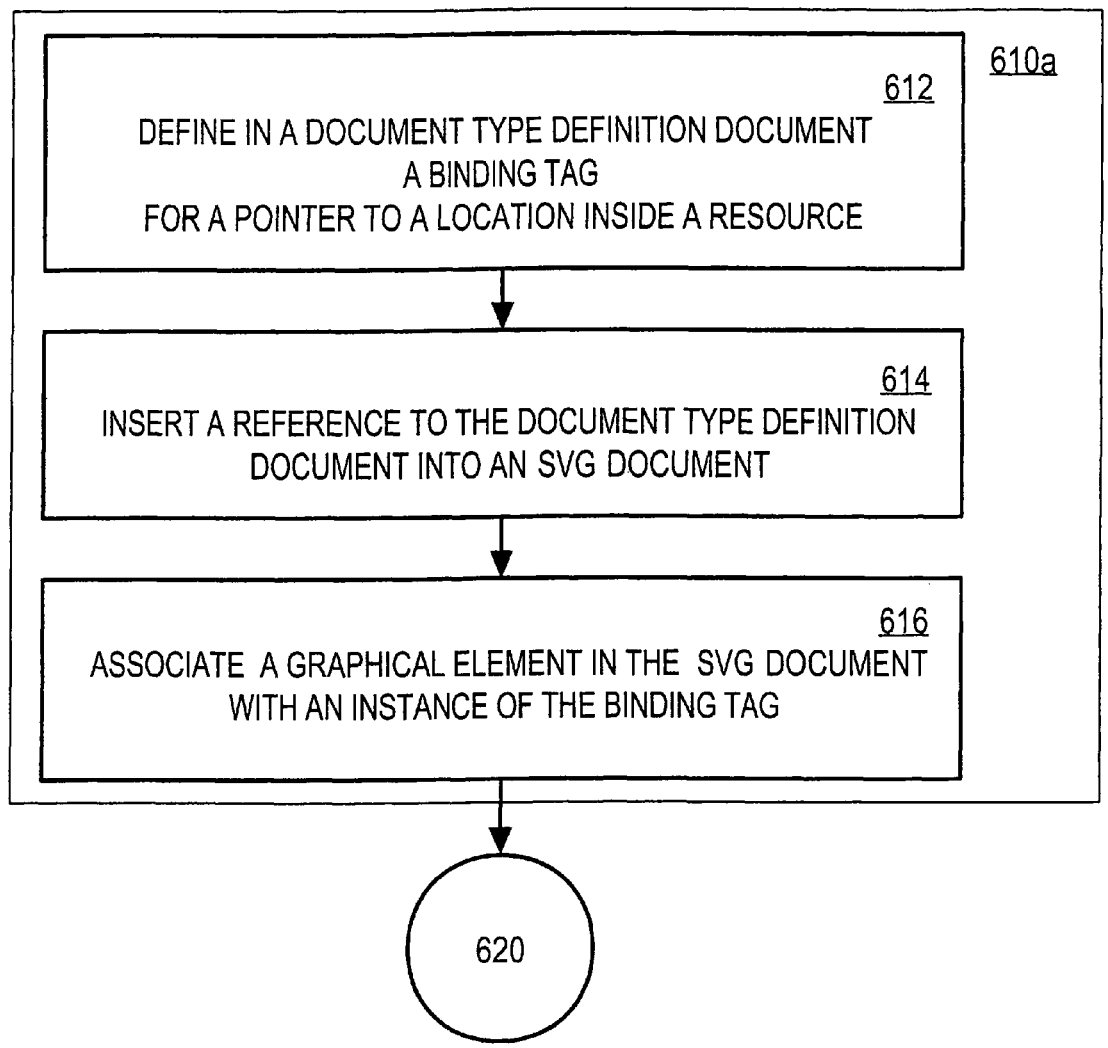
FIG. 6B is a flow chart for step 610 of FIG. 6A, according to one embodiment.

In step 610, an SVG document is produced with at least one binding element associated with at least one graphical element. Additional details about the step are given in FIG. 6B, which shows one embodiment 610a of step 610. In step 612, a document type definition file is created which defines a binding element that provides a pointer to a location inside a resource. The DTD need be defined and stored only once, and may thereafter be used for any or all SVG documents subsequently created. In step 614, an SVG document is produced that includes a reference to the document type definition file. In step 616, an instance of the binding element is associated with a graphical element in the SVG document. Control then passes to step 620 in FIG. 6A.

In step 620, the SVG document is presented to the user. This presentation is performed in this embodiment by an application that is programmed to use the binding elements. That application can reside on the server or on a client machine. The presentation of the SVG document can graphically display complex relationships among objects in the real world. For example, presenting the SVG document can show a network configuration or topology as in FIG. 7.

Figure 7:
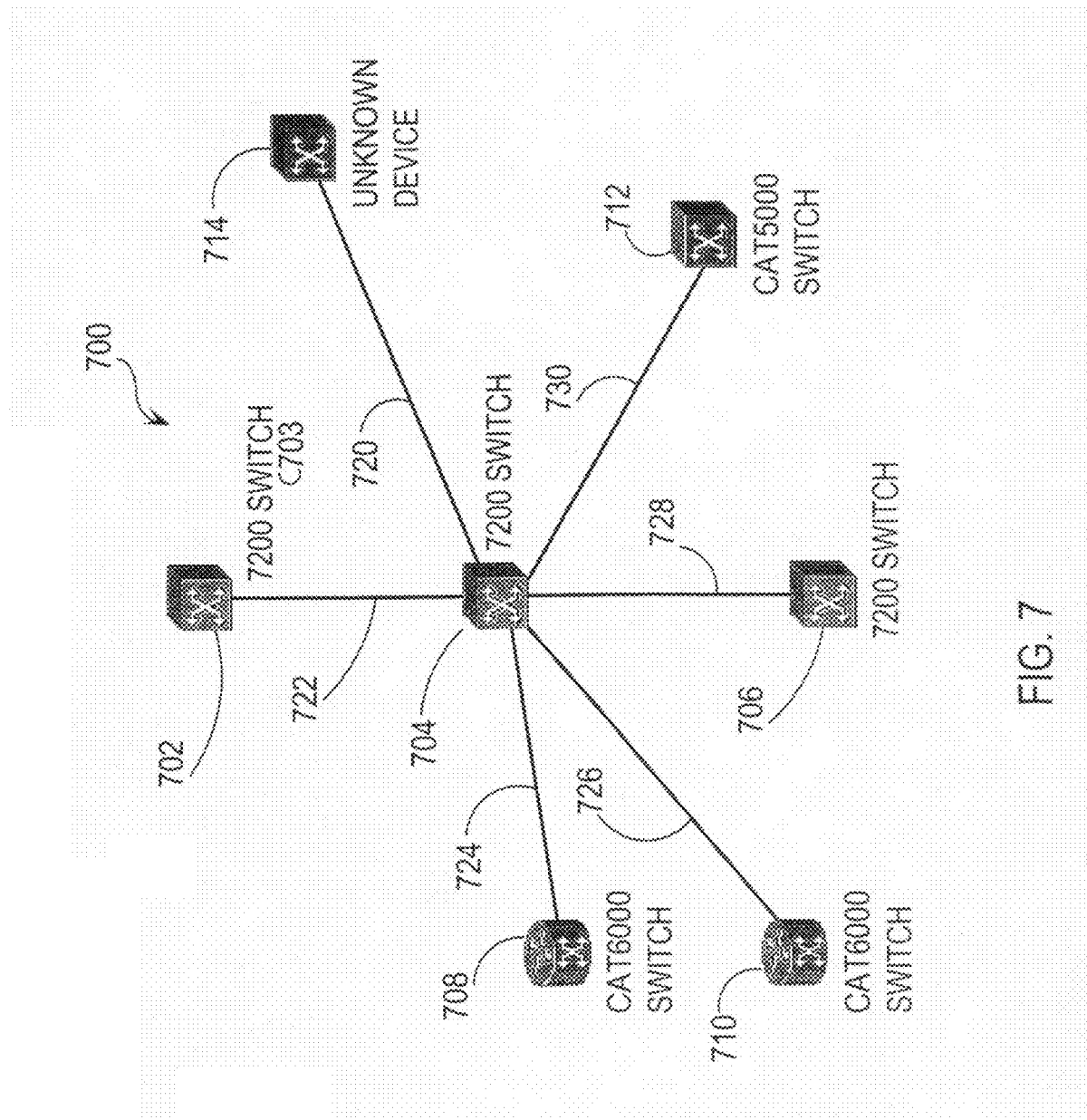
FIG. 7 is a graphical representation of a network configuration.

In the example of FIG. 7, network devices such as switches are displayed along with network links between those devices. For example a model 7200 switch of Cisco Systems, Inc., San Jose, Calif., is displayed by the icon 702 and the icon label 703. The connection, or network link, between two switches is represented by the line 722 connecting icons 702 and 704, representing model 7200 switches. A switch of a different model, such as a Catalyst 5000 switch from Cisco Systems, is represented by icon 712. In this example, icon 702 is a 32 pixel by 32 pixel bitmap image that is stored in a gif file named "32×32-ATMSwitch_green" in this embodiment. The SVG statement that references this file and positions this icon within the drawing in this embodiment is represented by the image element and attributes shown in FIG. 4.

In step 630, the application extracts a pointer to information inside the resource from the binding element in the SVG document. For example, the application extracts the values in the attributes of the bind.element element and the other elements in the bind namespace shown in FIG. 4.

In step 640, the application determines whether a user has selected a graphical element such as icon 702 in FIG. 7. For example the application determines whether the user has clicked a cursor control device or pointing device, such as a mouse, while a cursor has been placed over the icon 702 using the pointing device.

Figure 6C:
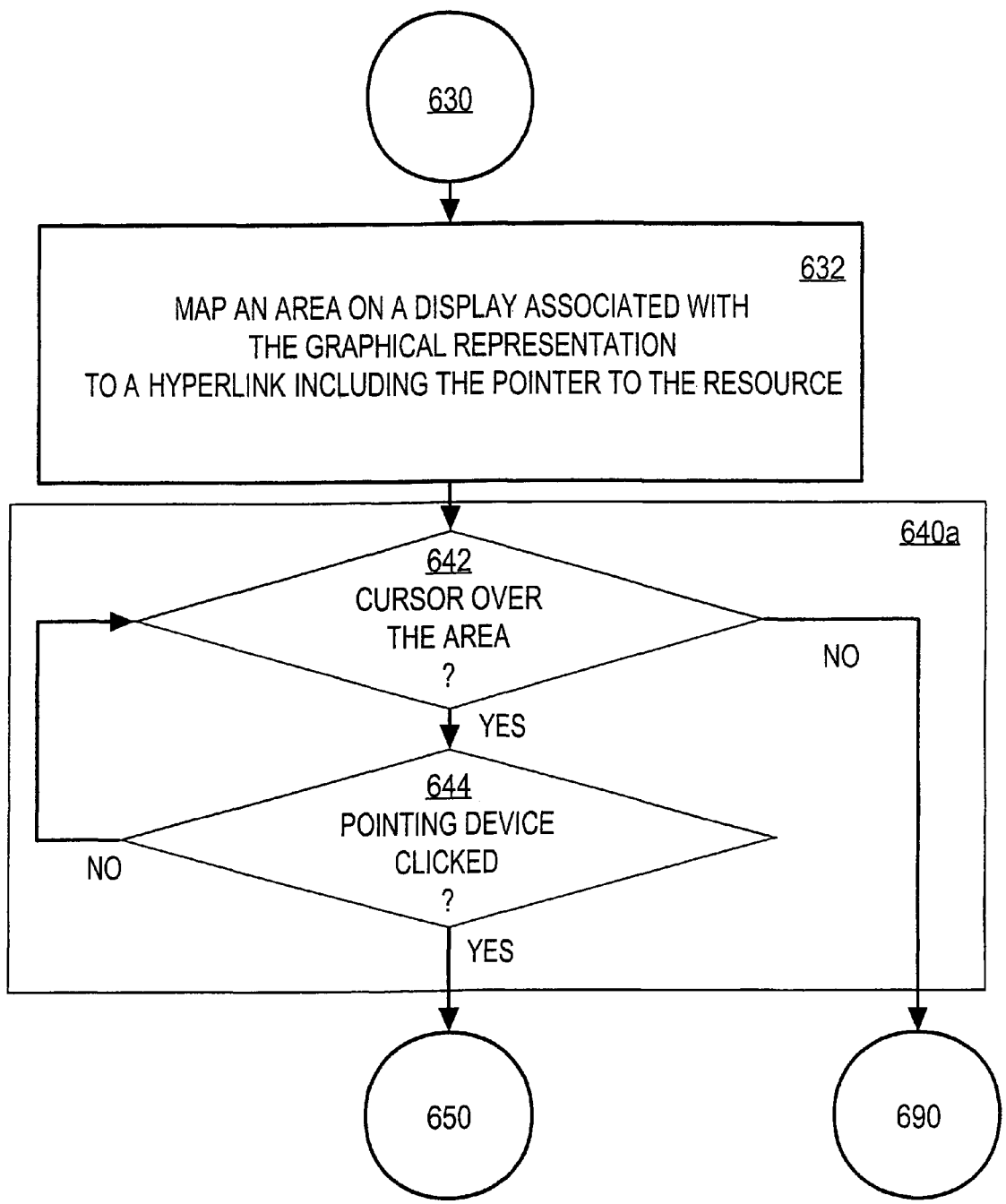
FIG. 6C is a flow chart of additional steps for the flowchart of FIG. 6A, according to one embodiment.

One way in which this determination can be made is illustrated in FIG. 6C. After step 630 has been performed, step 632 maps an area on a display associated with a graphical representation to a hyperlink. For example, the area on the display depicted in FIG. 7 associated with icon 702 is mapped to the hyperlink. The hyperlink is used by the application to transfer control to another resource. In this embodiment, the hyperlink includes a pointer to information inside the resource reference by the binding element. For example, the hyperlink includes a reference to resource 120 followed by parameters that point to where to find data inside the resource using values stored in the binding elements of FIG. 4.

In one embodiment, an XML style sheet is used to map the icon to the hyperlink. For example, in one embodiment the style sheet is an XSLT style sheet used to transform and present XML documents. In this case, the bind element is replaced with a link. In another embodiment statements in a scripting or programming language map the icon to the hyperlink. Once these links are inserted in the modified SVG document, the SVG document can be sent to a user's browser. The browser will interpret the links and respond to the user's manipulation of the pointing device using any of the parameter data inserted with the link.

In one embodiment of step 640, shown in FIG. 6C as step 640a, it is determined in step 642 whether a user has placed a cursor over the area associated with a graphical element. If not, control passes to point 690. If so, then it is determined in step 644 whether the pointing device has been clicked. If not, control flows back to step 642. If so, controlled passes to step 650 where the information in the resource is used.

If it is determined in step 640 of FIG. 6A or step 640a of FIG. 6C that the user has not selected a graphical element, the application continues with other functions at point 690. However, if a user has selected the graphical element, then control passes to step 650. In step 650, the application uses the information in the resource as indicated by the pointer. Examples of uses in various embodiments of step 650 include:

displaying a new window with information from the resource;

displaying a dialog box for editing data in the resource;

controlling the device, such as sending it commands over the network, or resetting its configuration;

calling another application and providing the other application with data from the resource;

inserting a hyperlink to another application and providing the pointer to the information in the resource as a parameter of the hyperlink; and inserting a hyperlink to another application and providing information from the resource as a parameter of the hyperlink.

Presenting Variable Data and Control Through a Thin SVG Interface

Figure 8A:
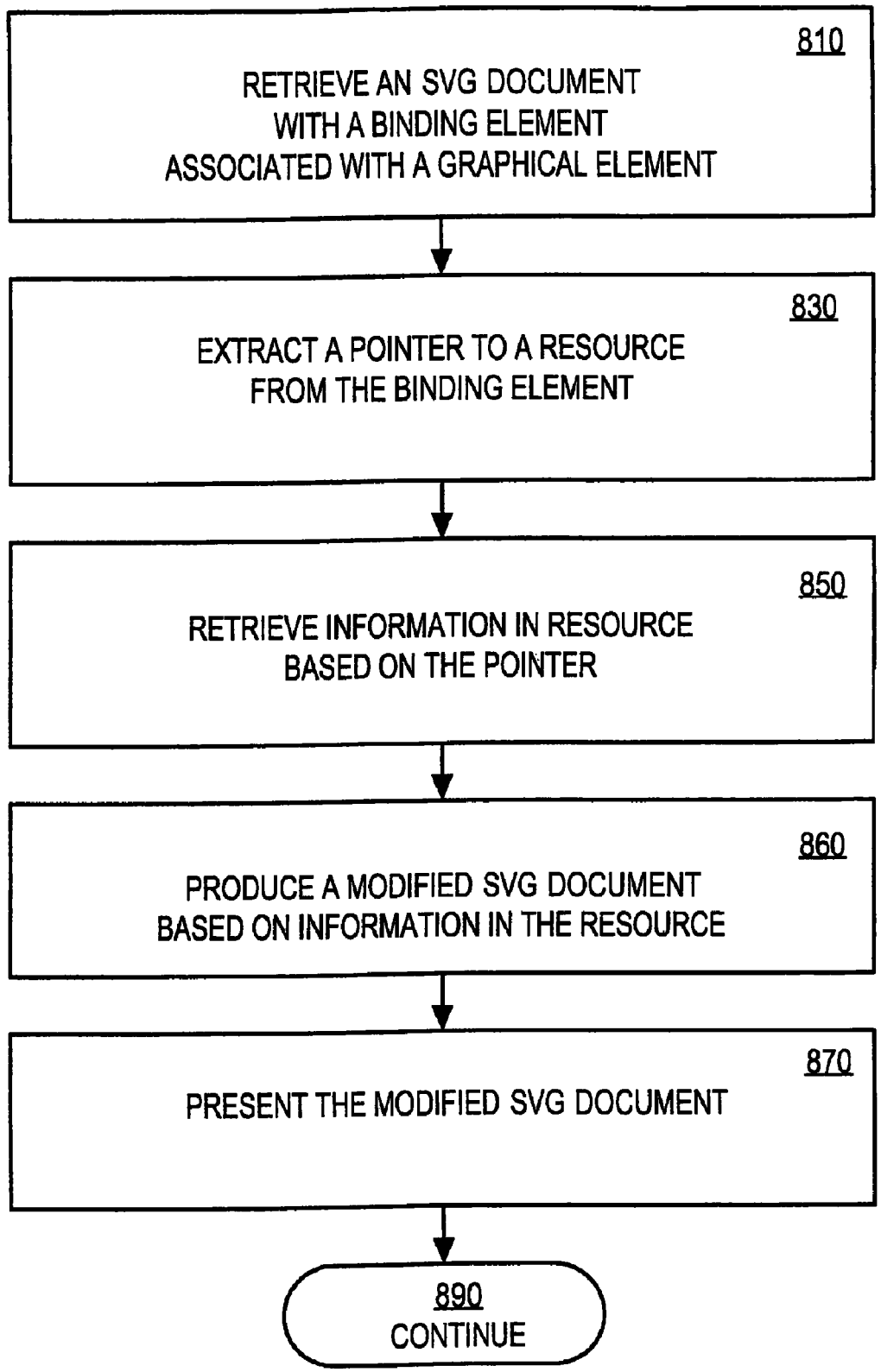
FIG. 8A is a flow chart for using SVG documents bound to information in separate resources.

FIG. 8A is a flow chart for using SVG documents bound to information in separate resources according to another embodiment. In step 810, an SVG document with a binding element associated with a graphical element is retrieved by an application, such as application 130 in FIG. 1. In step 830, a pointer to information within a resource is extracted from the binding element. In step 850, the application retrieves information needed by the application from the resource based on the pointer. The information needed by the application may be a small subset of the information in the resource, however, the information needed is not in the SVG document. In step 860, the application produces a modified SVG document based on the information retrieved from the resource. In step 870, the modified SVG document is presented to a user. In this embodiment a modified SVG document is sent over a network to a client process that is different than the application 130. The client process includes a plug-in for an SVG viewer. Thus the modified SVG document is presented to a client of the application 130. The client then interacts with a modified SVG document at point 890 and following.

In one embodiment, the modified SVG document includes a modified graphical element based on the information retrieved from the resource. For example, if the resource represents a database of information collected about devices on a network, then the current status of those devices can be displayed in the modified SVG document. Thus, if a switch represented by graphical element 702 in FIG. 7 goes off-line, this status is recorded in the database resource and retrieved by the application during step 850. In step 860, the application modifies the image element to reference a different bitmap that resembles the bitmap of icon 702 except that the color is red instead of green. Then when the modified SVG document is presented, the graphical representation of the device appears red instead of green in the display of network topology.

In some embodiments, some of the graphical elements in the original SVG are hidden in the modified SVG document. In some embodiments, some graphical elements are added into the modified SVG document. For example, if a user indicates a desire to see only network devices located in building X, then the application hides devices outside the building X. The application accomplishes this, for example, by retrieving the original SVG map, then retrieving the location of the devices from the resource using the binding elements. Next, the application extracts form the original SVG document, those graphical elements related to devices found in building X. The application then creates a new SVG document containing just the extracted graphical elements. The application can embellish the display by adding to the new SVG document a graphical element representing the building X, such as an image of the building.

Figure 8B:
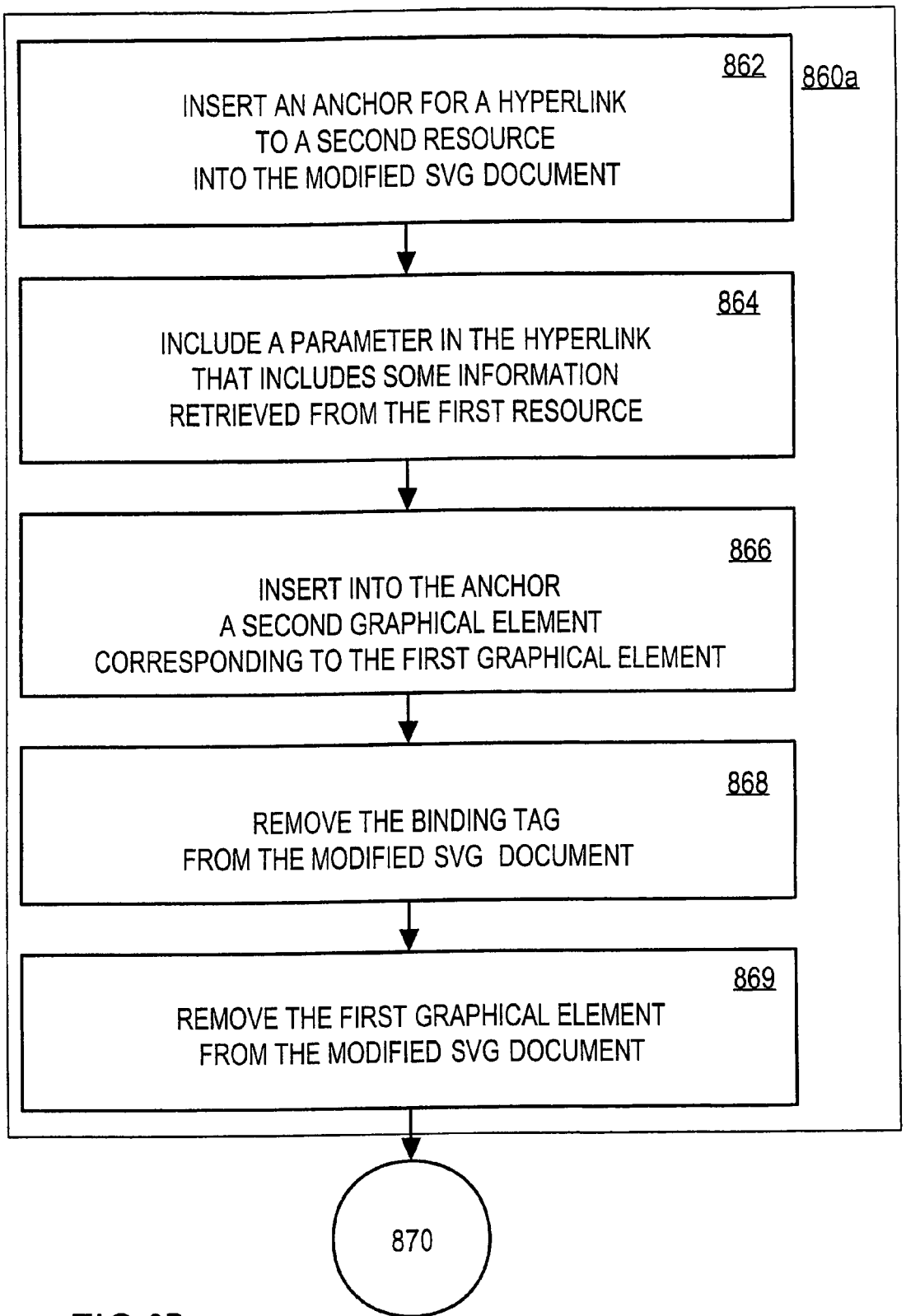
FIG. 8B is a flow chart for step 860 of FIG. 8A, according to another embodiment of the invention.

FIG. 8B is a flow chart for embodiment 860a of step 860 of FIG. 8A. In step 862 an anchor for a hyperlink to a second resource is inserted in the modified SVG document. For example, as shown in FIG. 5, an anchor is included in the modified SVG document with a hyperlink to an editing program in file "editDevice.jsp." In step 864, a parameter is included in the hyperlink that has information retrieved from the first resource into which the binding element points. For example, as shown in FIG. 5, the parameter "device-ip" has a value obtained from the first resource based on a location identified in the binding elements.

In step 866, a second graphical element is inserted into the anchor corresponding to the first graphical element associated with the binding elements. The second graphical element can be the same as the first graphical element. For example, as shown in FIG. 5, the image of a green switch is inserted within the anchor, before the end anchor element "</a>". This is the same image shown in FIG. 4 associated with the binding elements.

In this embodiment, as shown in step 868, the binding elements are not included in the modified SVG document. For example, as shown in FIG. 5, no binding elements are used. In step 869, the first graphical element is not used in the modified SVG document. That is, because the image was moved inside the anchor in the modified SVG document, the image element used in the original SVG document is not needed. If the modified SVG document was originally copied from the original SVG document, then the binding elements in the first graphical element are removed from the modified SVG document. Control then passes to step 870 to present the modified SVG document. In this case, the modified SVG document now contains hyperlinks to another application. In this example, the modified SVG document includes a hyperlink to the device-editing application.

These techniques provide the advantage of allowing a standard, thin SVG compliant client to interact with variable and complex data. The modified SVG document 140 is small yet responsive to changes in complex and extensive data in resource 120, and capable of controlling any functionally offered by multiple resources to which the graphical elements can be linked. The resource 120, the application 130 that produced the modified SVG document, and the other resources to which hyperlinks are provided, can all be intensive users of computational resources that reside on one or more servers on the network. Yet the client process is a thin SVG viewer, e.g., the size of the client program remains small and it demands a relatively small amount of computational power and network bandwidth from the client machine, compared to other methods of interacting with variable and complex data.

Example System

Figure 9A:
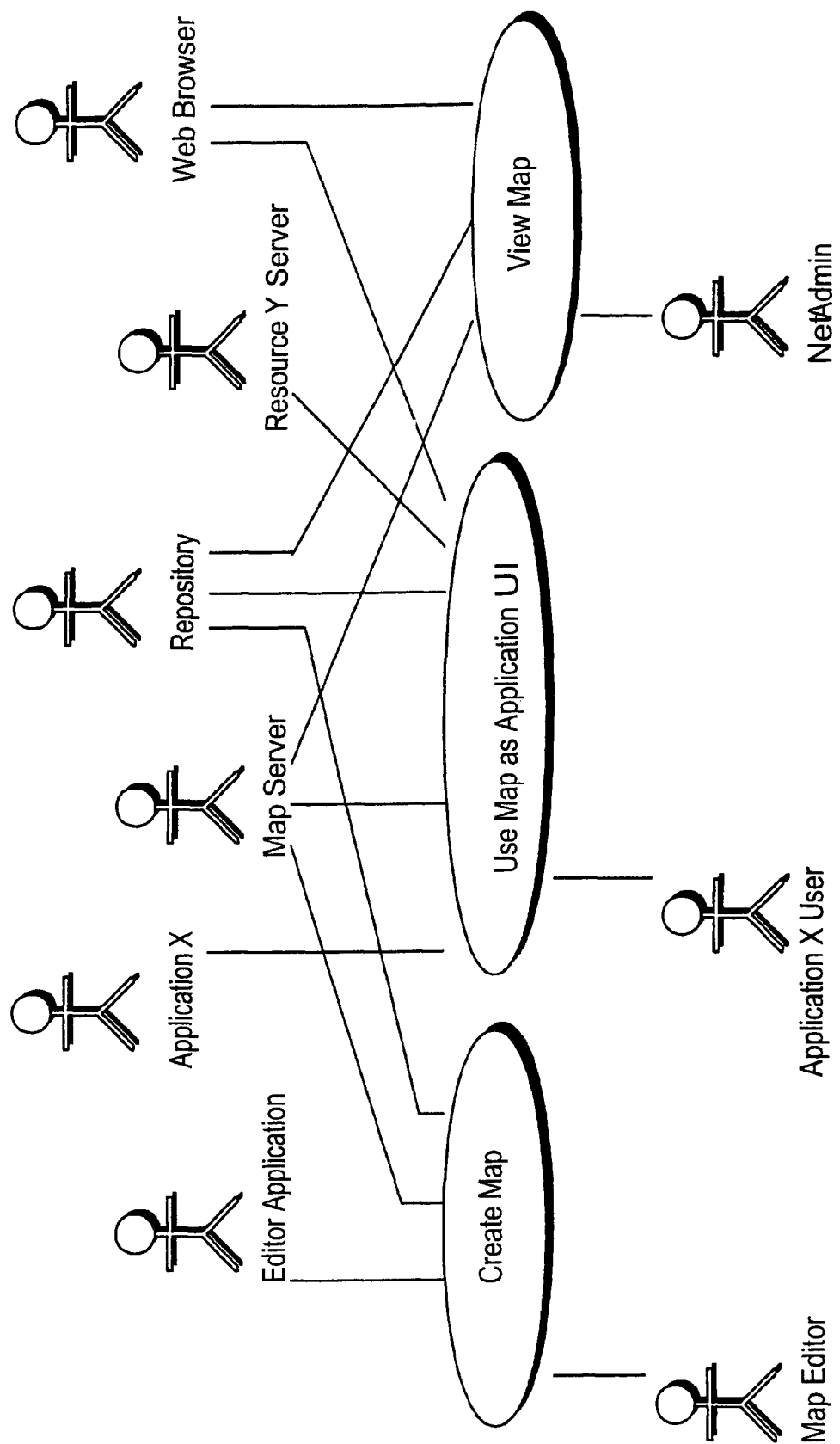
FIG. 9A is a use case diagram listing use cases and showing actors that participate in the use cases according to one embodiment.

An example of a system using the invention is shown in FIGS. 9A, 9B, 9C and 9D employing a standard software design language called UML well known in the art. FIG. 9A is a use case diagram listing the use cases and the actors that participate.

Actors can be humans or systems. According to this system, the actors include an Application X, like application 130 of FIG. 1, and a user of Application X. The actors also include an Editor Application, which provides the graphic interface for interactive creation and manipulation of bound SVG documents, like SVG document 110 in FIG. 1. In this system the SVG document is also called the map. The human actor who uses the Editor Application is the Map Editor. The Map Server is an actor that handles storage and retrieval of SVG documents and supports both an application interface and a web interface. The Net Admin is a human actor who uses the maps generated by other actors to view and monitor devices on a network. The actors include the Repository, which is the file system or database where the SVG documents are stored. The Web Browser is another actor which uses the SVG documents and any links in the document.

According to FIG. 9A, the example system includes three use cases, a Create Map use case, a Use Map as Application user interface (UI) use case, and a View Map use case. The actor Map Editor uses Create Map, which calls the Editor Application, the Map Server and the Repository. Application X uses the Map as Application UI, which calls the Map Server, the Repository and the Application. The Net Administrator uses View Map, which calls the Map Server and the Repository.

Figure 9B:
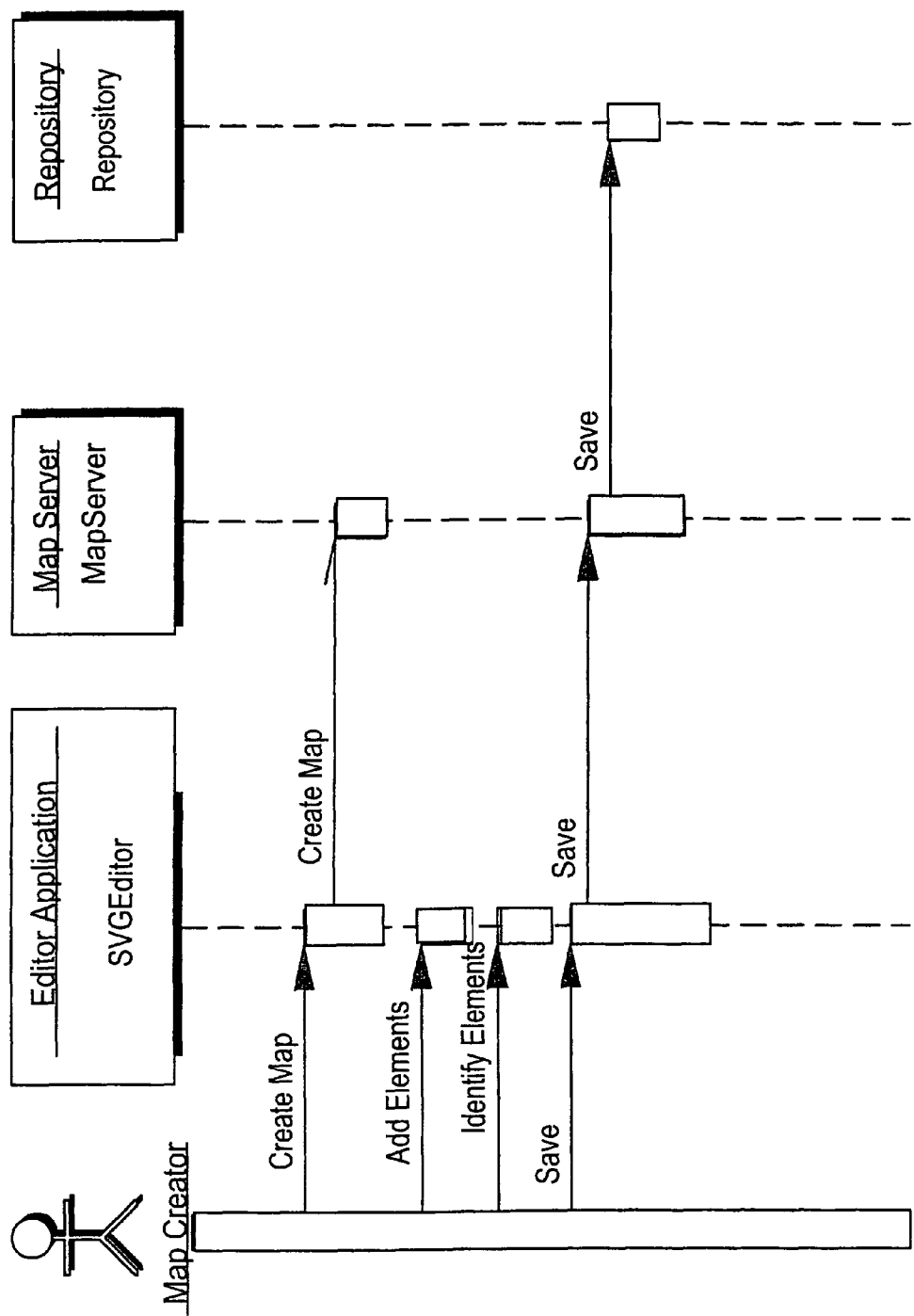
FIG. 9B is sequence diagram that shows the flow of events required to realize the create/edit map use case of FIG. 9A.

FIG. 9B is a sequence diagram showing the flow of events to realize the Create Map use case. The boxes at the top are software modules or actors. Time increases downward. The arrows show messages passed between the software modules or actors at different times. According to FIG. 9B, the Map Creator actor first sends a message to the Editor Application to create a map, which starts a process in the Editor Application, which later sends a message to the Map Server. At later times, the Map Creator actor adds graphical elements to the SVG document and identifies them by binding them to a resource by sending messages to the Editor Application. When the SVG document is done, the Map Creator sends a message to the Editor Application to save the SVG document. The Editor Application later sends a message to the Map Server, which itself sends a message to the Repository. The sequence diagram of FIG. 9B illustrates one embodiment for creating and storing the original SVG document 110 in FIG. 1.

Figure 9C:
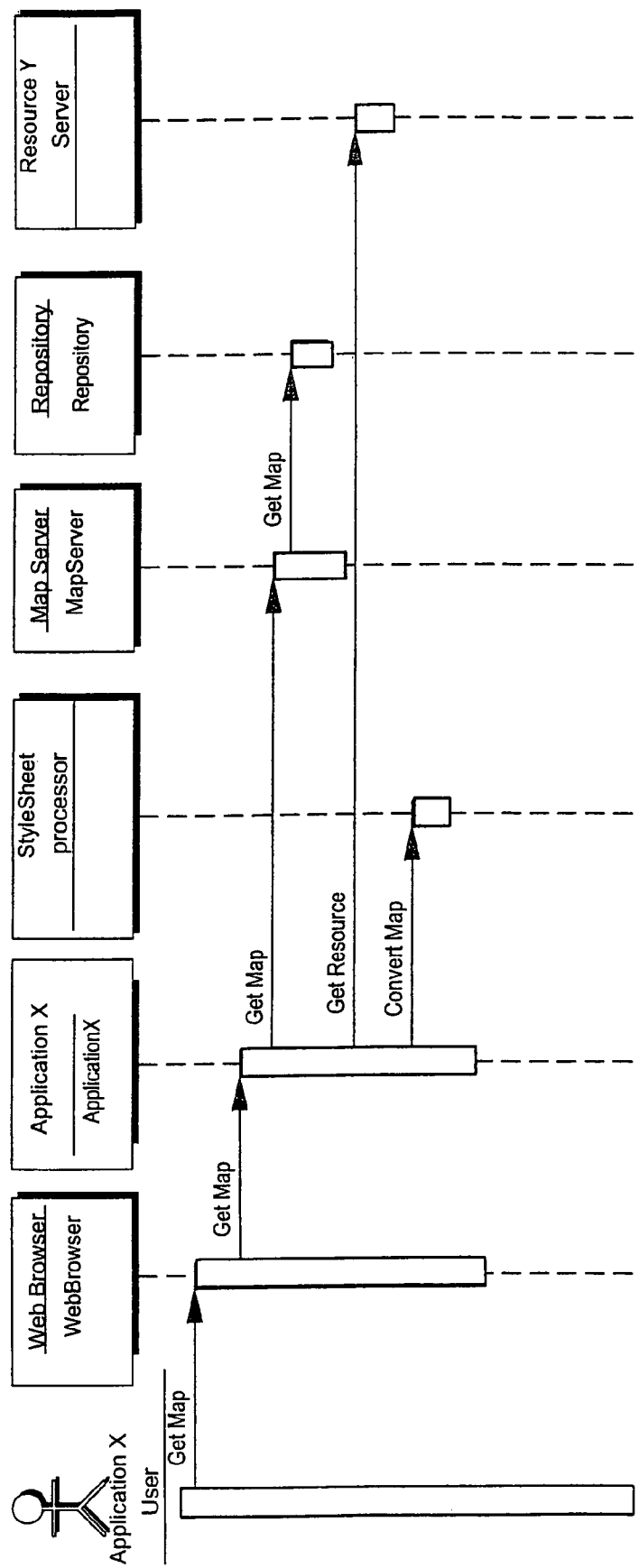
FIG. 9C is sequence diagram that shows the flow of events required to realize the use map as interface use case of FIG. 9A.
Figure 9D:
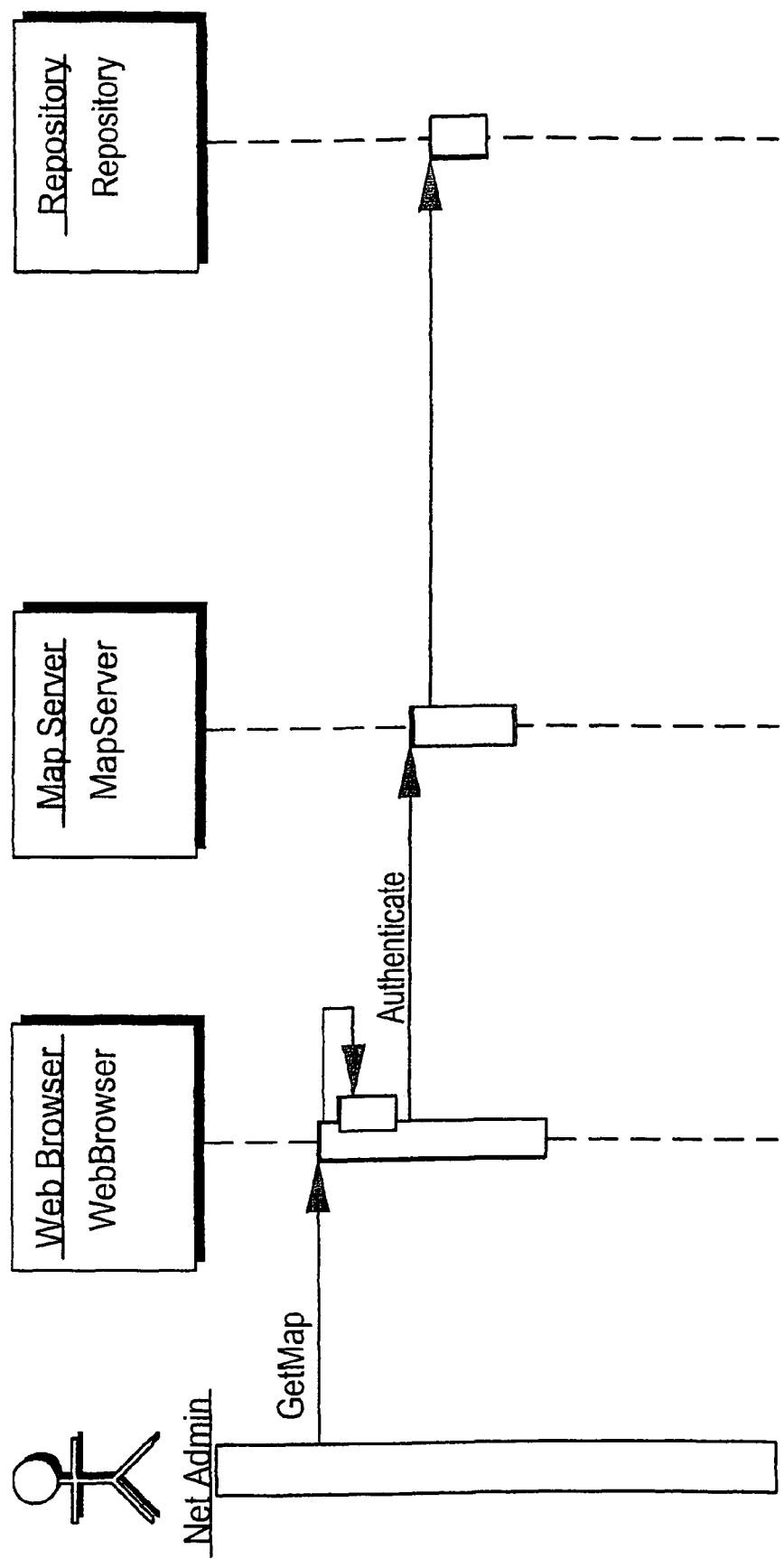
FIG. 9D is sequence diagram that shows the flow of events required to realize the view map use case of FIG. 9A.

FIG. 9C and FIG. 9D are sequence diagrams showing the flow of events to realize the use cases of FIG. 9A for Use Map as Application UI, and View Map, respectively.

Hardware Overview

Figure 2:
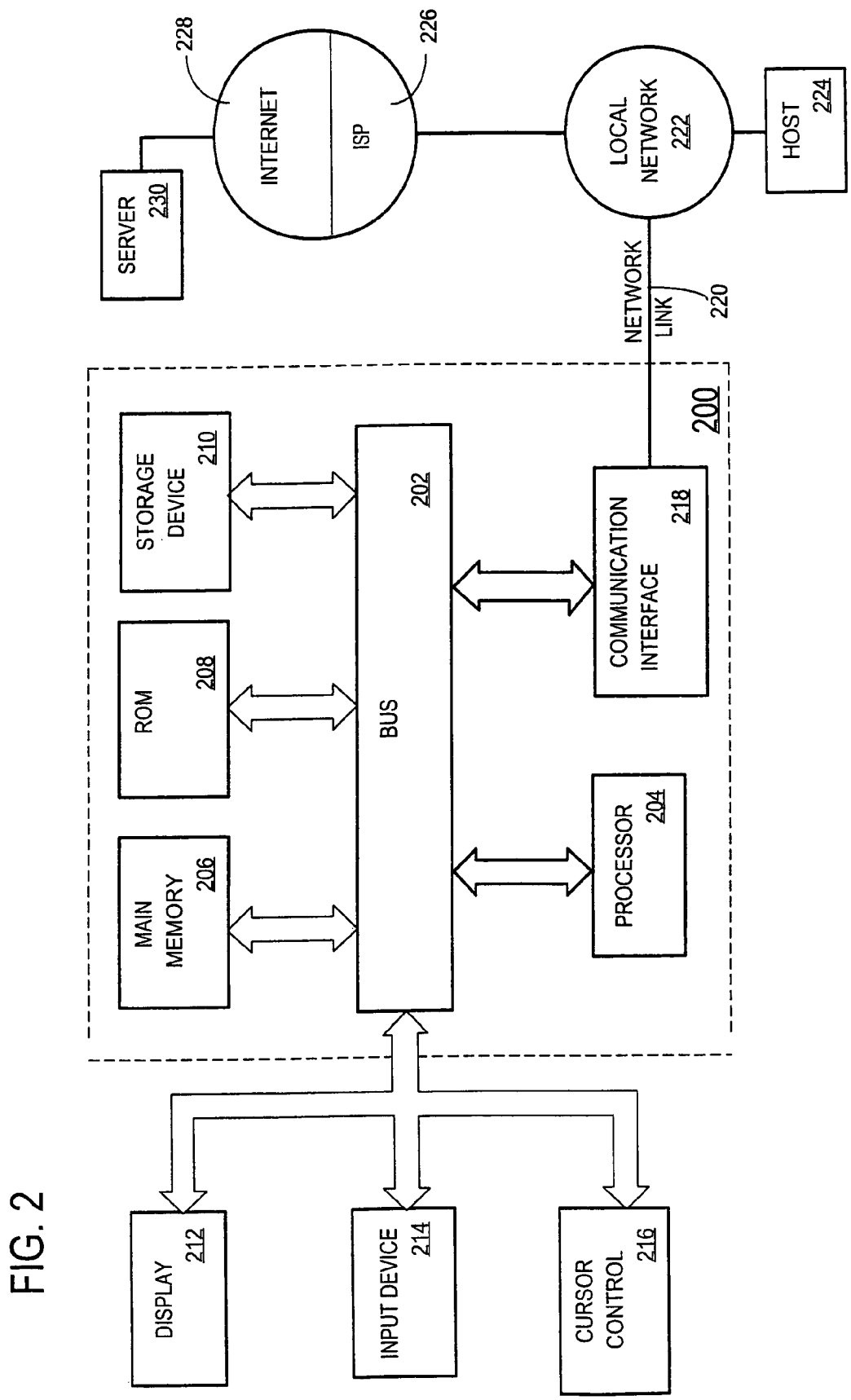
FIG. 2 is a block diagram of a computer system and network.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for binding graphical elements in SVG files to information in another resource. According to one embodiment of the invention, binding is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions or data to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for SVG statements with information from a separate resource as described herein.

The received code may be executed by processor 204 as it is received, and/or stored in storage device 210, or other non-volatile storage for later execution. In this manner, computer system 200 may obtain application code in the form of a carrier wave.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method comprising:
creating and storing scalable vector graphics (SVG) statements in a SVG document, wherein the SVG statements are associated with a first graphical representation of an object;
inserting into the SVG document a reference to a document type definition file, wherein the document type definition file defines a binding element for referencing a second document, wherein the second document includes information pertaining to the object;
wherein the document type definition file is a text file that includes one or more declarations conforming to eXtensible Markup Language (XML) syntax, wherein the one or more declarations define the binding element; and
binding the second document to the SVG statements from an instance of the binding element that is stored in the SVG document;
wherein binding the second document to the SVG statements comprises:
determining a query against the second document wherein, when evaluated, the query would return the information further pertaining to transferring control to a separate device from which inventory is requested and which is represented by the object included in the second document; and
inserting the query into the instance of the binding element that is stored in the SVG document;
wherein the method is performed by one or more computing devices.

2. The method of claim 1, further comprising:
retrieving the SVG document;
retrieving the information pertaining to the object from the second document based on the instance of the binding element;
modifying the SVG statements to generate modified SVG statements, wherein the modified SVG statements include the information pertaining to the object but do not include the instance of the binding element; and
storing the modified SVG statements, wherein the modified SVG statements are associated with a second graphical representation of the object.

3. The method of claim 2, further comprising providing the modified SVG statements in response to a request for the second graphical representation of the object.

4. The method of claim 2, wherein retrieving the information pertaining to the object comprises extracting a value from an attribute of the instance of the binding element, wherein the value is a pointer that references the second document.

5. The method of claim 1, wherein:
the binding element includes an attribute for referencing the second document through a pointer; and
binding the second document to the SVG statements comprises associating the instance of the binding element with the SVG statements, wherein the instance of the binding element includes the pointer.

6. The method of claim 5, wherein the pointer is a Universal Resource Identifier (URI) that identifies the second document.

7. The method of claim 1, wherein the object is one of a network device and a link between network devices.

8. A non-transitory computer-readable volatile or non-volatile medium storing one or more sequences of instructions which, when executed by one or more processors, cause:
creating and storing scalable vector graphics (SVG) statements in a SVG document, wherein the SVG statements are associated with a first graphical representation of an object;
inserting into the SVG document a reference to a document type definition file, wherein the document type definition file defines a binding element for referencing a second document, wherein the second document includes information pertaining to the object;
wherein the document type definition file is a text file that includes one or more declarations conforming to eXtensible Markup Language (XML) syntax, wherein the one or more declarations define the binding element; and
binding the second document to the SVG statements from an instance of the binding element that is stored in the SVG document;
wherein binding the second document to the SVG statements comprises:
determining a query against the second document wherein, when evaluated, the query would return the information further pertaining to transferring control to a separate device from which inventory is requested and which is represented by the object included in the second document; and
inserting the query into the instance of the binding element that is stored in the SVG document.

9. The non-transitory computer-readable volatile or non-volatile medium of claim 8, wherein the one or more sequences of instructions further comprise instructions which, when executed by the one or more processors, cause:
retrieving the SVG document;
retrieving the information pertaining to the object from the second document based on the instance of the binding element;
modifying the SVG statements to generate modified SVG statements, wherein the modified SVG statements include the information pertaining to the object but do not include the instance of the binding element; and
storing the modified SVG statements, wherein the modified SVG statements are associated with a second graphical representation of the object.

10. The non-transitory computer-readable volatile or non-volatile medium of claim 9, wherein the one or more sequences of instructions further comprise instructions which, when executed by the one or more processors, cause providing the modified SVG statements in response to a request for the second graphical representation of the object.

11. The non-transitory computer-readable volatile or non-volatile medium of claim 9, wherein the instructions that cause retrieving the information pertaining to the object comprise instructions which, when executed by the one or more processors, cause extracting a value from an attribute of the instance of the binding element, wherein the value is a pointer that references the second document.

12. The non-transitory computer-readable volatile or non-volatile medium of claim 8, wherein:
the binding element includes an attribute for referencing the second document through a pointer; and
the instructions that cause binding the second document to the SVG statements comprise instructions which, when executed by the one or more processors, cause associating the instance of the binding element with the SVG statements, wherein the instance of the binding element includes the pointer.

13. The non-transitory computer-readable volatile or non-volatile medium of claim 12, wherein the pointer is a Universal Resource Identifier (URI) that identifies the second document.

14. The non-transitory computer-readable volatile or non-volatile medium of claim 8, wherein the object is one of a network device and a link between network devices.

15. An apparatus comprising:
one or more processors; and
logic encoded in one or more non-transitory computer-readable media for execution and, when executed by the one or more processors, operable to:
create and store scalable vector graphics (SVG) statements in a SVG document, wherein the SVG statements are associated with a first graphical representation of an object;
insert into the SVG document a reference to a document type definition file, wherein the document type definition file defines a binding element for referencing a second document, wherein the second document includes information pertaining to the object;
wherein the document type definition file is a text file that includes one or more declarations conforming to eXtensible Markup Language (XML) syntax, wherein the one or more declarations define the binding element; and
bind the second document to the SVG statements from an instance of the binding element that is stored in the SVG document;
wherein the logic operable to bind the second document to the SVG statements comprises logic that is operable to:
determine a query against the second document wherein, when evaluated, the query would return the information further pertaining to transferring control to a separate device from which inventory is requested and which is represented by the object included in the second document; and
insert the query into the instance of the binding element that is stored in the SVG document.

16. The apparatus of claim 15, wherein the logic further comprises logic which, when executed by the one or more processors, is operable to:
retrieve the SVG document;
retrieve the information pertaining to the object from the second document based on the instance of the binding element;
modify the SVG statements to generate modified SVG statements, wherein the modified SVG statements include the information pertaining to the object but do not include the instance of the binding element; and
store the modified SVG statements, wherein the modified SVG statements are associated with a second graphical representation of the object.

17. The apparatus of claim 16, wherein the logic further comprises logic which, when executed by the one or more processors, is operable to provide the modified SVG statements in response to a request for the second graphical representation of the object.

18. The apparatus of claim 16, wherein the logic operable to retrieve the information pertaining to the object comprises logic which, when executed by the one or more processors, is operable to extract a value from an attribute of the instance of the binding element, wherein the value is a pointer that references the second document.

19. The apparatus of claim 15, wherein:
the binding element includes an attribute for referencing the second document through a pointer; and
the logic operable to bind the second document to the SVG statements comprises logic which, when executed by the one or more processors, is operable to associate the instance of the binding element with the SVG statements, wherein the instance of the binding element includes the pointer.

20. The apparatus of claim 19, wherein the pointer is a Universal Resource Identifier (URI) that identifies the second document.

21. The apparatus of claim 15, wherein the object is one of a network device and a link between network devices.

22. An apparatus comprising:
means for creating and storing scalable vector graphics (SVG) statements in a SVG document, wherein the SVG statements are associated with a first graphical representation of an object;
means for inserting into the SVG document a reference to a document type definition file, wherein the document type definition file defines a binding element for referencing a second document, wherein the second document includes information pertaining to the object;
wherein the document type definition file is a text file that includes one or more declarations conforming to eXtensible Markup Language (XML) syntax, wherein the one or more declarations define the binding element; and
means for binding the second document to the SVG statements from an instance of the binding element that is stored in the SVG document;
wherein the means for binding the second document to the SVG statements comprise:
means for determining a query against the second document wherein, when evaluated, the query would return the information further pertaining to transferring control to a separate device from which inventory is requested and which is represented by the object included in the second document; and
means for inserting the query into the instance of the binding element that is stored in the SVG document.

* * * * *